US009240895B2

(12) United States Patent
Ree

(10) Patent No.: US 9,240,895 B2
(45) Date of Patent: Jan. 19, 2016

(54) METHOD, SYSTEM AND DEVICE OF MULTICAST FUNCTIONALITY IN AN ENERGY PORTAL

(75) Inventor: Bradley Richard Ree, Cumming, GA (US)

(73) Assignee: General Electric Company, Schenectady, NY (US)

(*) Notice: Subject to any disclaimer, the term of this patent is extended or adjusted under 35 U.S.C. 154(b) by 1064 days.

(21) Appl. No.: 13/273,075

(22) Filed: Oct. 13, 2011

(65) Prior Publication Data

US 2013/0093601 A1    Apr. 18, 2013

(51) Int. Cl.
| | |
|---|---|
| G01R 11/04 | (2006.01) |
| G08B 23/00 | (2006.01) |
| G08C 15/06 | (2006.01) |
| G08C 19/22 | (2006.01) |
| H04Q 9/00 | (2006.01) |
| G01R 21/00 | (2006.01) |
| G01R 21/06 | (2006.01) |
| H04L 12/28 | (2006.01) |

(52) U.S. Cl.
CPC ....... *H04L 12/2838* (2013.01); *H04L 2012/285* (2013.01)

(58) Field of Classification Search
None
See application file for complete search history.

(56) References Cited

U.S. PATENT DOCUMENTS

| 6,333,975 | B1 | 12/2001 | Brunn et al. | |
|---|---|---|---|---|
| 7,054,902 | B2 * | 5/2006 | Toporek et al. | 709/203 |
| 7,894,430 | B2 | 2/2011 | Maalouf et al. | |
| 8,799,481 | B2 * | 8/2014 | Chamarti et al. | 709/227 |
| 2003/0067889 | A1 * | 4/2003 | Petite | 370/310 |
| 2004/0122930 | A1 | 6/2004 | Pasternak | |

(Continued)

FOREIGN PATENT DOCUMENTS

| WO | 0148977 A2 | 7/2001 |
|---|---|---|
| WO | 2008013379 A2 | 1/2008 |

OTHER PUBLICATIONS

Office Action issued in connection with corresponding NZ Application No. 602850 on Jan. 23, 2014.

(Continued)

*Primary Examiner* — Firmin Backer
*Assistant Examiner* — Jerold Murphy
(74) *Attorney, Agent, or Firm* — Sutherland Asbill & Brennan LLP

(57) ABSTRACT

Described herein are embodiments of methods, systems and devices of providing multicast functionality through an energy portal such as a meter, which reduces bandwidth required for communication between the energy portal and a server. In accordance with one aspect, a method is provided of providing multicast functionality through an energy portal, which reduces bandwidth required for communication between the energy portal and a server. In one embodiment, the method includes: receiving, over a first network, a single message, wherein the single message includes at least one device characteristic; determining, using a processor, one or more devices associated with the at least one device characteristic, wherein each of the one or more devices are connected to a second network; and transmitting the single message over the second network to each of the one or more devices associated with the at least one device characteristic, wherein the single message is transmitted individually to each of the one or more devices associated with the at least one device characteristic such that the single message is transmitted as many times as there are devices associated with the at least one device characteristic.

26 Claims, 8 Drawing Sheets

(56) References Cited

U.S. PATENT DOCUMENTS

2009/0135836 A1\* 5/2009 Veillette ........................ 370/400
2010/0106787 A1   4/2010 Grohman
2012/0029717 A1\* 2/2012 Cox et al. ...................... 700/295
2012/0221162 A1   8/2012 Forbes, Jr.

OTHER PUBLICATIONS

Search Report from corresponding GB Application No. GB1217829.9 dated Feb. 14, 2013.

\* cited by examiner

| Unique Meter Identifier | Unique Device/ Appliance Identifier | Unique Device/ Appliance Identifier | Unique Device/ Appliance Identifier | |
|---|---|---|---|---|
| 123456 | 123456-1 | 123456-2 | ... | 123456-n |
| ABC123 | ABC123-A | ABC123-B | ... | ABC123-n |
| 17859928 | 6723546 | 02873RGV | P082743BC | ... |
| 111111 | 222222 | ... | ... | ... |
| ... | ... | ... | ... | ... |

FIG. 4

METHOD, SYSTEM AND DEVICE OF MULTICAST FUNCTIONALITY IN AN ENERGY PORTAL

FIELD OF THE INVENTION

This invention generally relates to utility communications, and in particular, to systems, methods, and apparatus for providing multicast functionality in an energy portal such as a utility meter.

BACKGROUND OF THE INVENTION

The increasing demand for energy and the use of finite resources for energy production have led to the use of increased technology for the production, transmission, distribution and consumption of energy in order to make, distribute and use energy more efficiently and wisely. To that end, utility service providers have begun employing information technology systems integrated with their energy production, transmission, distribution and metering systems to enable more efficient monitoring and operation of such systems. Concurrently, vendors and manufacturers have also begun employing similar technology in products and devices that consume electricity, such as appliances (e.g., refrigerators, washing machines and dryers, dishwashers, HVAC systems, lighting systems, stoves, water heaters, etc.) and electronics (e.g., televisions, stereos, computers, etc.). These efforts are often broadly categorized as smart grid, smart meter and smart appliance or smart device technologies.

The smart grid marries information technology with the current electrical infrastructure. The smart grid is, in essence, an "energy Internet," delivering real-time energy information and knowledge—empowering smarter energy choices. Roles for the smart grid include enabling the integration and optimization of more renewable energy (such as wind and solar); driving significant increases in the efficiency of the electrical network; and, empowering consumers to manage their energy usage and save money without compromising their lifestyle.

Smart grid technologies provide utilities and consumers with real-time knowledge and decision-making tools that empower them to save energy, resources, money, and the environment. The smart grid is not a singular product, but rather a collection of hardware and software that works together to make today's electrical grid more intelligent. Similar to how the Internet turned a disaggregated collection of computers into a more powerful tool, overlaying the current power infrastructure with smart grid technology is like connecting the Internet to the computer, making an already useful machine much better and providing people with information to make intelligent decisions. Similarly, the smart grid, or the "energy Internet," empowers consumers, businesses and utilities to make smarter energy choices.

Smart grid components include automation software and intelligent electronic hardware systems that control the transmission and distribution grids. Smart grid automation technologies—such as energy management systems and distribution management systems—help provide real-time knowledge and control over the distribution and transmission grids. On the transmission side, Energy Management Systems (EMS) provide real-time information on the grid's status, helping utilities automate various grid functionalities remotely. This automation technology helps utilities choose the best, most affordable generation mix (known as economic dispatch), keeping costs lower for consumers and businesses; reduce losses and waste in the delivery of power to drive a more efficient system; and maintain system reliability to help ensure a steady supply of power to customers. A Distribution Management System (DMS) comprises the smart grid automation technology that provides utilities with real-time information about the distribution network and allows utilities to remotely control switches in the grid. The DMS is the heart of a smarter distribution grid, enabling utilities to manage distributed renewable generation, support grid efficiency technologies, and control the isolation and restoration of outages. Without DMS, the utility gets very little real-time information about the distribution grid and can't realize many of the benefits of a smarter grid.

Furthermore, smart grid technologies can extend beyond the electrical grid. With smart grid technologies in the home—like smart meters, smart energy panels, and smart appliances—consumers can have access to more accurate data and knowledge about electricity pricing, helping them save money and lower their environmental footprint.

Currently, most power companies offer one set price for electricity throughout the day, regardless of how expensive it is to produce. Most consumers don't know that it costs much more to produce energy during the peak hours of the day—typically between 2 p.m. and 7 p.m.—than it does at any other time. A smart meter can communicate time of use pricing via smart home energy panels or other display devices to help consumers make smarter energy choices throughout the day. Consumers will be more likely to use high-consuming devices during off-peak pricing periods, when electricity prices are cheaper. With smart meters, buying electricity is like buying other consumer goods—with price impacting the purchase decision. For example, a consumer can choose to have his or her house pre-cooled before arriving home to ensure the air conditioning system can remain off during expensive peak pricing hours, without impacting the consumer's comfort level. A consumer can also have water pre-heated to avoid peak prices and lower his or her energy bill. A year-long study by the U.S. Department of Energy showed that real-time pricing information provided by the smart meter helped consumers reduce their electricity costs 10% on average and their peak consumption by 15%.

Smart meters can also enable consumers to pre-pay their electricity bills and help utilities better detect and manage outages. Smart meters coupled with advanced metering infrastructure (AMI) help pinpoint problems on the grid, allowing utilities to determine exactly which customers are without power. Compare this to today, when many utilities still wait for customer calls to notify them of outages.

Smart appliances can work in concert with smart meters and the smart grid to avoid peak-hour energy use and top-tier pricing-without any negative impact on the consumer by adapting to price signals from the utility. For example, a dryer may automatically switch from high heat to "fluff" if electricity hits a certain per-kilowatt-hour rate—even if the homeowner is at work. Or, the automatic defrost on a refrigerator can delay itself until a time of reduced electricity rates. If the freezer delays the defrost cycle until after peak energy hours, consumers pay less for the same amount of energy. There are countless ways to conserve energy and save money when smart appliances are coupled with smart meters and time-of-use pricing information including, for example, updating the software or firmware of smart appliances using the smart grid and smart meter infrastructure. The smart grid, smart meter and smart appliance technologies enable utilities to communicate (duplex) with smart appliances in the home. This ability creates opportunities beyond that of energy management.

For example, in some instances a meter (e.g., a "smart meter") can act as an energy service portal (ESP), which provides a connection between a first network (e.g., the network between the head end server and the meter), and a second network (e.g., the network between the devices within the home and the meter). Whenever a device, such as a smart appliance, joins the second network, the device can report what clusters (capabilities) the device will support. For example, a programmable thermostat may support load control, pricing, and messaging. However, a pool pump controller may only support load control.

The second network receives its messages from the head end server of the first network, or a demand response management system (DRMS). The DRMS has mechanisms to manage customer consumption of electricity in response to supply conditions; for example, having electricity customers reduce their consumption at critical times or in response to market prices. DRMS involves messages sent to demand response mechanisms that respond to these explicit requests to shut off. Demand response can involve actually curtailing power used or by starting on-site generation which may or may not be connected in parallel with the grid. Demand response is a component of smart energy demand, which also includes energy efficiency, home and building energy management, distributed renewable resources, and electric vehicle charging. Current demand response schemes are implemented with large and small commercial as well as residential customers, often through the use of dedicated control systems to shed loads in response to a request by a utility or market price conditions. Services (lights, machines, air conditioning) are reduced according to a preplanned load prioritization scheme during the critical time frames. An alternative to load shedding is on-site generation of electricity to supplement the power grid. Under conditions of tight electricity supply, demand response can significantly decrease the peak price and, in general, electricity price volatility.

Demand response is generally used to refer to mechanisms used to encourage consumers to reduce demand, thereby reducing the peak demand for electricity. Since electrical generation and transmission systems are generally sized to correspond to peak demand (plus margin for forecasting error and unforeseen events), lowering peak demand reduces overall plant and capital cost requirements. Depending on the configuration of generation capacity, however, demand response may also be used to increase demand (load) at times of high production and low demand. Some systems may thereby encourage energy storage to arbitrage between periods of low and high demand (or low and high prices).

These messages, which can be DRMS requests, are passed over the first network, to the meter, into the home and to the devices via the second network. When a load control message, pricing information, display message, or other types of messages need to be sent to a device in the home, the head end server will send a message to each device in the home which requires the data. Also, when the device in the home participates in the event, the device will send a message to the server. If there are multiple load control devices in the home, multiple messages will be sent from the head end, over the first network, through the meter, into the home and to the devices. Similarly, multiple participation messages will be sent from the devices over the second network, to the meter, through the first network and back to the head-end server. Because the network may serve thousands of meters, the amount of traffic caused this unicast functionality can become overwhelming.

Therefore, methods, systems and devices are desired that overcome challenges in the art, some of which are described above, to provide communication with smart appliances through smart grid and smart meter technology.

BRIEF DESCRIPTION OF THE INVENTION

Described herein are embodiments of methods, systems and devices for bi-directional communication with devices using smart grid and smart meter technology. In particular, systems, methods and devices are disclosed herein that reduce the traffic on the network between the meter and the head end server by providing multicast functionality through the meter.

In accordance with one aspect, a method is described for providing multicast functionality through an energy portal such as a meter, which reduces bandwidth required for communication between the energy portal and a server. In one embodiment, the method includes: receiving, over a first network, a single message, wherein the single message includes at least one device characteristic; determining, using a processor, one or more devices associated with the at least one device characteristic, wherein each of the one or more devices are connected to a second network; and transmitting the single message over the second network to each of the one or more devices associated with the at least one device characteristic, wherein the single message is transmitted individually to each of the one or more devices associated with the at least one device characteristic such that the single message is transmitted as many times as there are devices associated with the at least one device characteristic.

In accordance with yet another aspect, a system is described for providing multicast functionality through an energy portal, which reduces bandwidth required for communication between the energy portal and a server. One embodiment of the system is comprised of: a first network; a computing device connected to the first network; a second network; one or more devices connected to the second network; and an energy portal, wherein the energy portal comprises a network interface, a memory and a processor, wherein the network interface connects the energy portal with the first network and the second network, and wherein the processor is configured to: receive using the network interface and over the first network, a single message, wherein the single message includes at least one device characteristic; determine one or more of the devices that are connected to the second network that are associated with the at least one device characteristic; and transmit, using the network interface, the single message over the second network to each of the one or more devices associated with the at least one device characteristic, wherein the single message is transmitted individually to each of the one or more devices associated with the at least one device characteristic such that the single message is transmitted as many times as there are devices associated with the at least one device characteristic.

In accordance with yet another aspect, a device (i.e., meter, energy portal) is described for providing multicast functionality through an energy portal, which reduces bandwidth required for communication between the energy portal and a server. One embodiment of the energy portal comprises: a network interface; a memory; and a processor, wherein the network interface connects the energy portal with a first network and a second network, and wherein the processor is configured to: receive using the network interface and over the first network, a single message, wherein the single message includes at least one device characteristic; determine one or more of the devices that are connected to the second network that are associated with the at least one device characteristic; and transmit, using the network interface, the single message over the second network to each of the one or more devices associated with the at least one device characteristic, wherein the single message is transmitted individually to each of the one or more devices associated with the at least one device characteristic such that the single message is transmitted as many times as there are devices associated with the at least one device characteristic.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 illustrates an exemplary table that can be used to associate a unique meter identifier with one or more unique device identifiers of devices that are operably connected with the identified meter via the second network;

DETAILED DESCRIPTION OF THE INVENTION

Figure 1:
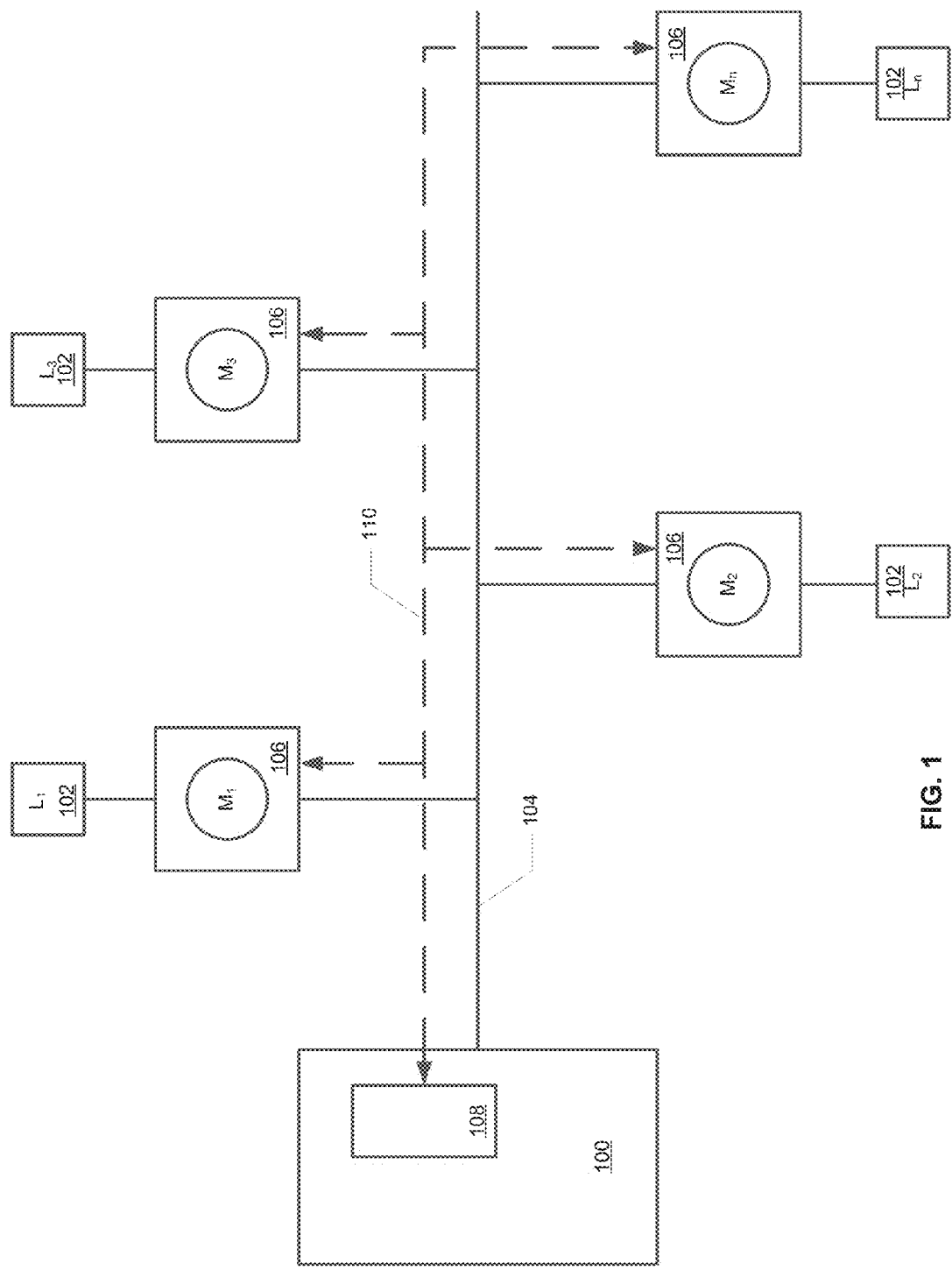
FIG. 1 is a block diagram of a section of an exemplary utility distribution system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, steps in the disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

Smart appliances are appliances that can be programmed to operate when it is most cost effective to do so based on time-of-use pricing signals from the utility. For example, a smart refrigerator would only enable the defrost cycle to occur when electricity prices are lowest, without compromising a consumer's lifestyle. In some instances, smart appliances are programmed or otherwise receive communications over networks, and can communicate with other computing devices and smart appliances over these networks. Smart devices such as programmable thermostats and water heater controls are configured to communicate with other computing devices, other smart devices, smart appliances and smart meters over one or more networks. Herein, smart appliances and smart devices will be referred to as "smart devices" or just "devices." Smart meters are among the fundamental building blocks of smart grid deployments. They track and report energy usage by time of day, enabling utilities to charge less for electricity used during off-peak hours. As a result, consumers can choose to shift energy-intensive activities to times when rates are lower to save on energy costs. In general, smart devices can be configured to communicate with a smart meter and smart meters are configured to communicate with the smart grid. Generally, these communications are duplex. Because of the expected proliferation of smart devices, networks that handle the communication between the device, the meters and the smart grid may become burdened with the amount of traffic. Therefore, embodiments described herein provide methods, systems and devices for reducing the traffic on these networks.

Referring to FIG. 1, an illustration of one type of system that would benefit from embodiments of the present invention is provided. FIG. 1 is a block diagram of a section of an exemplary utility distribution system such as, for example, an electric distribution system. As shown in FIG. 1, a utility service is delivered by a utility provider 100 to various loads $L_1$-$L_n$ 102 through a distribution system 104. In one aspect, the utility service provided is electric power. Consumption of the utility service by the loads 102 is measured at the load locations by meters $M_1$-$M_n$ 106. If an electric meter, the meter 106 can be single-phase or poly-phase electric meters, as known to one of ordinary skill in the art, depending upon the load 102. In one aspect, the electric meter 106 is a smart meter as described herein and as known to one of ordinary skill in the art. In one aspect, the meter 106 can act as an energy portal. An energy portal is a device or software that can be used to communicate with one or more devices within a home or at a location regarding energy consumption of the devices. For example, an energy portal can receive consumption information from a device and pass that information on to a utility provider 100. Similarly, an energy portal can receive communications from a utility provider 100 and cause one or more devices to shut down or to reduce their load. In addition to the meter 106 described herein, an energy portal can also be a computer, processor, stand-alone device, and the like. Hereinafter, the specification will refer to an "energy portal" as a "meter," "electric meter," and/or "smart meter," where the terms can be used interchangeably, though it is to be appreciated that an energy portal is not limited to a meter and that a meter is only one example of an energy portal. One non-limiting example of a smart meter is the GE 1210+c meter as available from General Electric Company (Schenectady, N.Y.). In one aspect, the meter 106 can be configured to communicate via a second network (not shown in FIG. 1) with the loads 102. In one aspect, the meter 106 can be configured to communicate wirelessly with the loads 102 using, for example, a network such as a home area network (HAN). In one aspect, the loads 102 can be devices such as smart appliances, as described herein and as known to one of ordinary skill in the art. Smart appliances are available from vendors or manufacturers such as, for example, General Electric Company, Whirlpool Corporation (Benton Harbor, Mich.), and LG Electronics USA (Englewood Cliffs, N.J.), among others. While consumption information is used by the utility provider 100 primarily for billing the consumer, it also can be used for other purposes including planning and profiling the utility distribution system. In many instances, meters 106 are still read by hand, which can be costly, inefficient and error-prone. In some instances, utility providers 100 desire to electronically communicate with the meters 106 for numerous purposes including scheduling disconnection or connection of utility services to the loads 102, automatic meter reading (AMR), load shedding and load control, automatic distribution and smart-grid applications, outage reporting, providing additional services such as Internet, video, and audio, etc. In many of these instances, the meters 106 can be configured to communicate with one or more computing devices 108 through a communications network 110, which can be wired, wireless or a combination of wired and wireless, as known to one of ordinary skill in the art. In one aspect, the communications network 110 can comprise at least part of a smart grid network. Therefore, it is desired that the meters 106 and the system such as that shown in FIG. 1 are configured to have capabilities beyond that of mere delivery and measurement of utility services. Described herein are embodiments of methods, systems and devices to communicate with devices using a smart grid and smart meters. In general, the technical effect of embodiments of the present invention provide an improvement over current methods of communicating with smart devices by reducing the amount of communication traffic on communications network 110.

Figure 2:
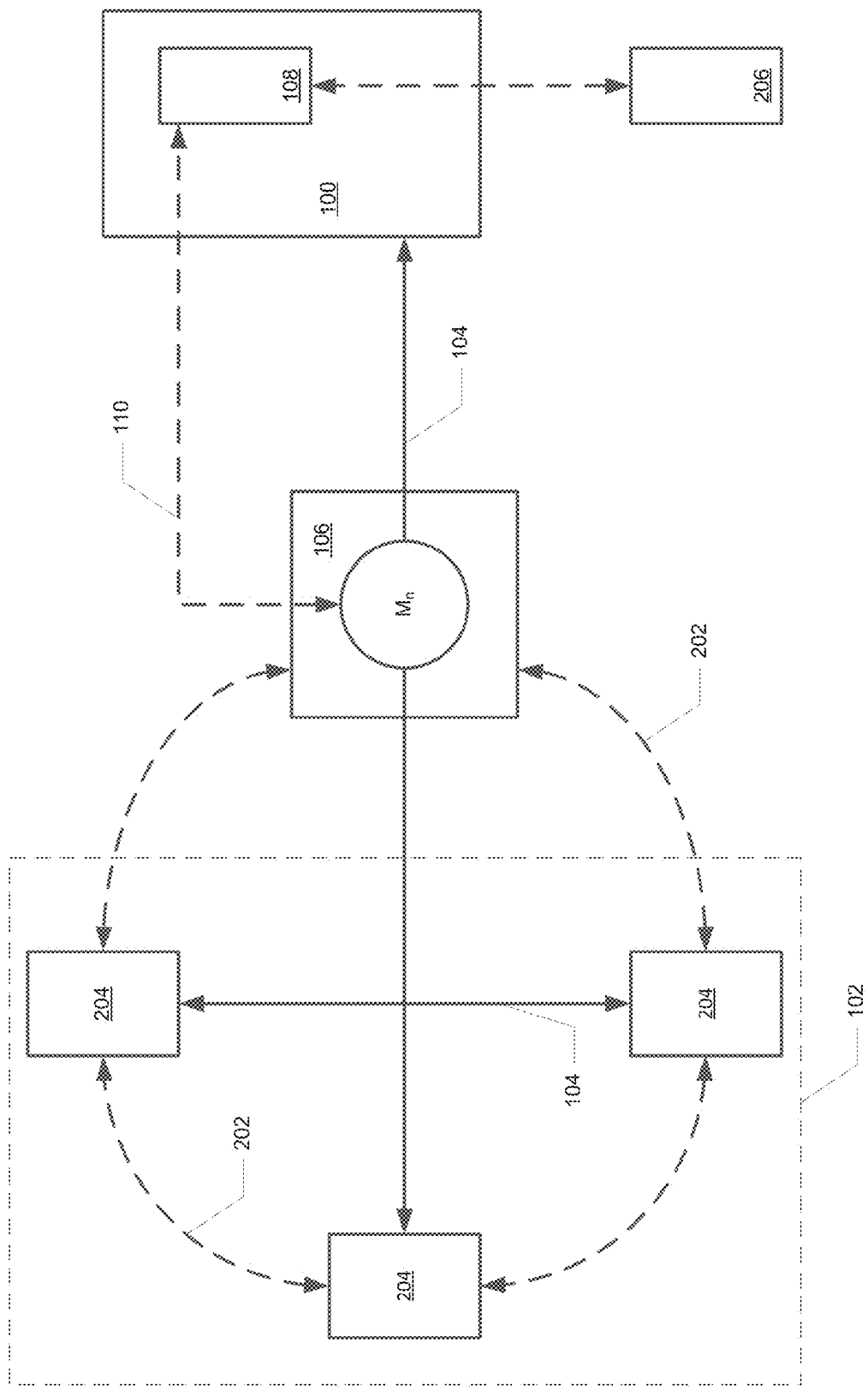
FIG. 2 is an exemplary illustration of an embodiment of a system comprised of an energy portal (e.g., a meter) configured to communicate with one or more appliances or devices over a second network and configured to communicate with a computing device over a first network.

FIG. 2 is an exemplary illustration of an embodiment of a system comprised of a meter 106 configured to communicate with one or more appliances or devices 204 over a second network and configured to communicate with a computing device 108 over a first network 110. In one aspect, the devices 204 are smart appliances and smart devices as described herein and as known to one of ordinary skill in the art. As used herein, the specification will refer to a device 204 as an "appliance," a "smart appliance," a "smart device" and/or a "device," where the terms can be used interchangeably. As shown in FIG. 2, a second network 202 is used to communicate between one or more smart appliances or devices 204 and the meter 106. In one aspect, one or more devices 204 comprise at least a portion of the load 102, and can form a second network 202 that communicates with the meter 106. The meter 106 also measures consumption of the utility service (e.g., electric power) as provided by the distribution system 104. Furthermore, the meter 106 is configured to communicate over a first network 110. In one aspect, the meter 106 can communicate with at least a computing device 108 via the first network 110. In one aspect, the meter 106 is operably connected to the second network 202. In one aspect, the meter 106 receives information from a device 204 operably connected to the second network 202 via the second network 202. For example, the device 204 can be configured to transmit registration information when it is first plugged in or installed. Whenever a device 204 joins the second network 202, the device 204 can report what clusters (characteristics) the device 204 will support. For example, a programmable thermostat may support load control, pricing, and messaging. However, a pool pump controller may only support load control. Other examples of devices 204 include an in-home energy display, a demand response load controller, a prepayment terminal, and the like. The registration information, device characteristics, and any other information can be transmitted to or from the meter 106 from the device 204 via the second network 202 comprised of one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, HAN, OpenHAN, power line carrier (PLC), broadband over power lines (BPL), and the like. In one aspect, this registration process can occur automatically. In one aspect, the information can include a unique identifier for the device 204. For example, in one instance the unique appliance identifier can be an address on the second network 202 that uniquely identifies the device 204. Other identifiers can be, for example, the serial number of the device 204, or the serial number in combination with the model number of the device 204. In one aspect, the meter 106 can transmit at least a portion of the registration information to the computing device 108 via the first network 110. For example, in one instance, the meter 106 can transmit the unique device identifier to the computing device 108 via the first network 110. Furthermore, in one aspect the meter 106 can also transmit a meter identifier that uniquely identifies the meter 106 to the computing device 108 connected to the first network 110. For example, in one aspect, the meter identifier that uniquely identifies the meter 106 can be a network address (e.g., IP address, MAC address, etc.) of the meter 106 on the first network 110. The registration information or the meter identifier that uniquely identifies the meter 106 and any other information can be transmitted to or from the computing device 108 from the meter 106 via the first network 110 that can be comprised of one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, HAN, OpenHAN, power line carrier (PLC), broadband over power lines (BPL), and the like. In one aspect, the first network 110 comprises at least a portion of a smart grid network. In one aspect, the first network 110 comprises an advanced metering infrastructure (AMI). AMI refers to systems that measure, collect and analyze energy usage, and interact with advanced devices such as electricity meters, gas meters, water meters, and the like through various communication media either on request (on-demand) or on pre-defined schedules. This infrastructure includes hardware, software, communications, consumer energy displays and controllers, customer associated systems, meter data management (MDM) software, supplier and network distribution business systems, and the like. The first network 110 between the measurement devices (e.g., meters 106) and the business systems allows collection and distribution of information to customers, suppliers, utility companies and service providers. This enables these businesses to either participate in, or provide, demand response solutions, products and services. By providing information to customers, the system assists with a change in energy usage from their normal consumption patterns, either in response to changes in price or as incentives designed to encourage lower energy usage at times of peak-demand periods or higher wholesale prices or during periods of low operational systems reliability.

Figure 3:
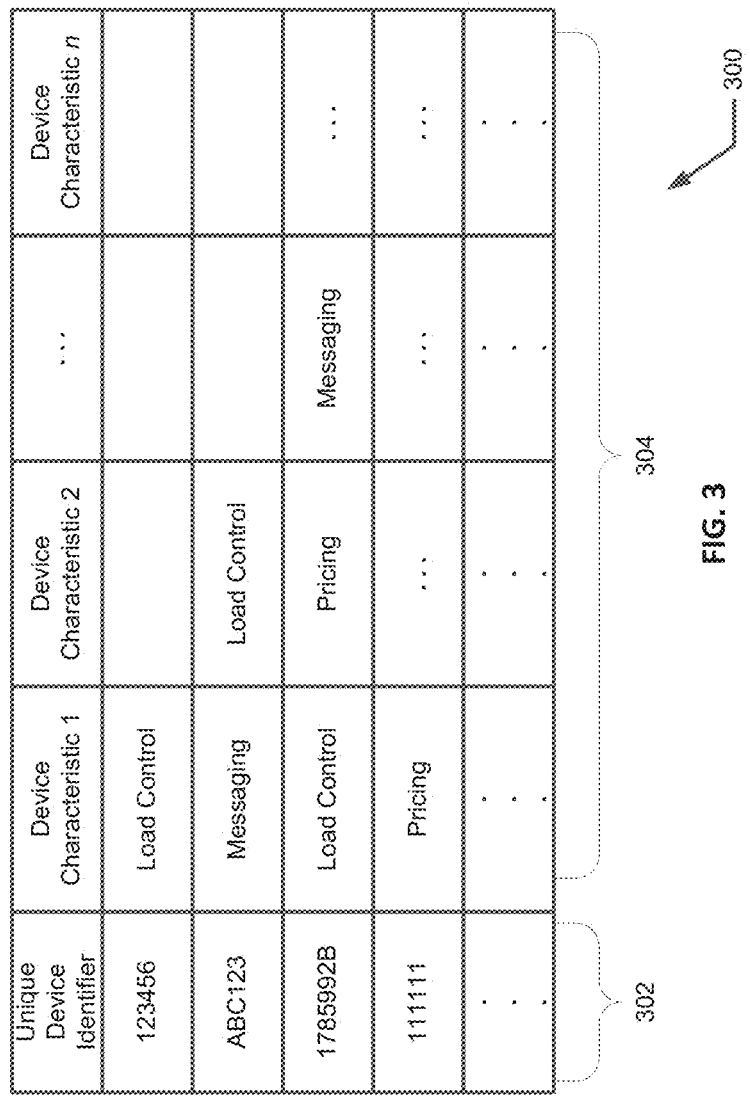
FIG. 3 illustrates an exemplary database that can be used to associate a unique device identifier with one or more characteristics of devices that are operably connected with the identified energy portal via the second network.

In one aspect, the meter 106 can receive, over the first network 110, a single message. In one aspect, the single message can comprise at least one device characteristic such as, for example, load control, pricing and messaging. In one aspect, the single message can include one or more of an address for the meter 106 to receive the message, a device type for the devices 204 to be affected by the meter 106, and an address for a device 204 on the second network 202. For example, the second network 202 can be a HAN and the single message can include one or more of an address for the meter 106 to receive the message, a HAN device type for the devices 204 to be affected by the meter 106, and a HAN address. In one aspect, the single message is transmitted by the computing device 108 over the first network 110 to the meter 106. A processor within the meter 106 can determine one or more devices 204 associated with the at least one device characteristic, wherein each of the one or more devices 204 are connected to a second network 202. For example, in one aspect the single message comprises a device type for the devices 204 to be affected by the meter 106, and an address for a device 204 on the second network 202. For example, the single message can include an indicator, wherein a processor associated with the meter 106 is configured to detect the indicator such that the single message is sent only to a single device 204 on the second network 202 or to a plurality of the devices 204 on the second network 202. In one aspect, the indicator can be an address (e.g., HAN address) for a single device on the second network 202. In another aspect, the indicator can be a device type such that a plurality of devices 204 on the second network 202 that share the same type (e.g., HAN device type) all receive the message. In another aspect, a memory associated with the meter 106 can comprise a database where a device identifier is stored along with one or more characteristics of the device 204. Such a database is shown in FIG. 3. FIG. 3 illustrates an exemplary database 300 that can be used to associate a unique device identifier 302 with one or more characteristics 304 of devices 204 that are operably connected with the identified meter 106 via the second network 202. Using such a database 300, the meter 106 can transmit the message only to the devices 204 that share the at least one device characteristic contained within the message. For example, the message may be a command to turn off all electrical load control devices for one hour. Therefore, the characteristic contained within the message is load control. The message is received by the meter 106 and the processor of the meter 106 compares the characteristic of the message against the characteristics 304 of the devices 204 that are connected to the meter 106 by the second network 202, as such characteristics are stored in the database 300. Using the database, the meter processor finds all devices 204 connected to the meter 106 by the second network 202 that share the characteristic of load control. The processor of the meter 106 can compare the at least one device characteristic received in the single message with the device characteristics of each device stored in the database 300. The single message can be transmitted over the second network 202 to each of the one or more devices 204 associated with the at least one device characteristic, wherein the single message is transmitted individually to each of the one or more devices 204 associated with the at least one device characteristic such that the single message is transmitted as many times as there are devices 204 associated with the at least one device characteristic. For example, the meter processor can transmit the load control message to each of the devices 204 connected to the meter 106 by the second network 202 that share the load control characteristic, thereby instructing each device that receives the message to shut off for one hour. The message is sent individually to each device 204 that shares the load control characteristic, one device 204 at a time. In other words, if there are three devices 204 connected to the meter 106 by the second network 202 that share the load control characteristic, then the message is sent to one device, then sent to the second device, and lastly sent to the third device. The message is not sent to all three devices at once. The unique device identifier 302 of the database 300 can be a network address for the device 204 on the second network 202, which can be used when sending the message to the devices 204.

In one aspect, the meter 106 can receive an acknowledgment or participation notice from each of the one or more devices 204 that received the message. The participation notice can be transmitted by the devices 204 over the second network 202 to the meter 106. The meter 106 can store on its memory a log of the participation notices. The log can identify the device 204 that sent the participation notice, and the characteristic (e.g., load control, pricing and messaging) that the device 204 has participated in. For example, the log can store the unique network address of the devices 204 that have received a message and the at least one characteristic contained within the message. The log can be transmitted in a singular event by the meter 106 to the computing device 108 over the first network 110. In one aspect, the log is compressed by removing duplicate information prior to being transmitted over the first network 110. In another aspect, the log can be compressed using compression algorithms before it is transmitted over the first network 110.

In one aspect, the computing device 108 can receive information for the device 204. For example, in one instance the information can include a software update, a firmware update, load control instructions, pricing information or a message to be displayed by the device 204. In one instance, the information can be electronically transmitted to the computing device 108. For example, the computing device 108 can be connected to the Internet and can electronically receive the information. In one aspect, the information can be transmitted to the computing device 108 from a separate computing device 206 such as a manufacturer or vendor's computing device. In one aspect, the information can include the unique identifiers of the devices 204 that are to receive a message. In one aspect, the computing device 108 can maintain a table of unique device identifiers associated with the corresponding unique meter identifier for those devices. Such a list is shown in FIG. 4. FIG. 4 illustrates an exemplary table 400 that can be used to associate a unique meter identifier 402 with one or more unique device identifiers 404 of devices 204 that are operably connected with the identified meter 106 via the second network 202. Using such a list, the computing device 108 can transmit the message only to the meters 106 that are associated with the devices 204 that are to be affected. Therefore, in one instance the computing device 108 transmits the message to the meter 106 via the first network 110 using the unique identifier for the device 204 and the meter identifier. Once the message is received by the meter 106 from the computing device 108 over the first network 110, the meter 106 can determine one or more devices 204 associated with the at least one device characteristic, wherein each of the one or more devices 204 are connected to a second network 202, and transmit the message individually to each of the one or more devices 204 associated with the at least one device characteristic such that the single message is transmitted as many times as there are devices 204 associated with the at least one device characteristic.

Figure 5:
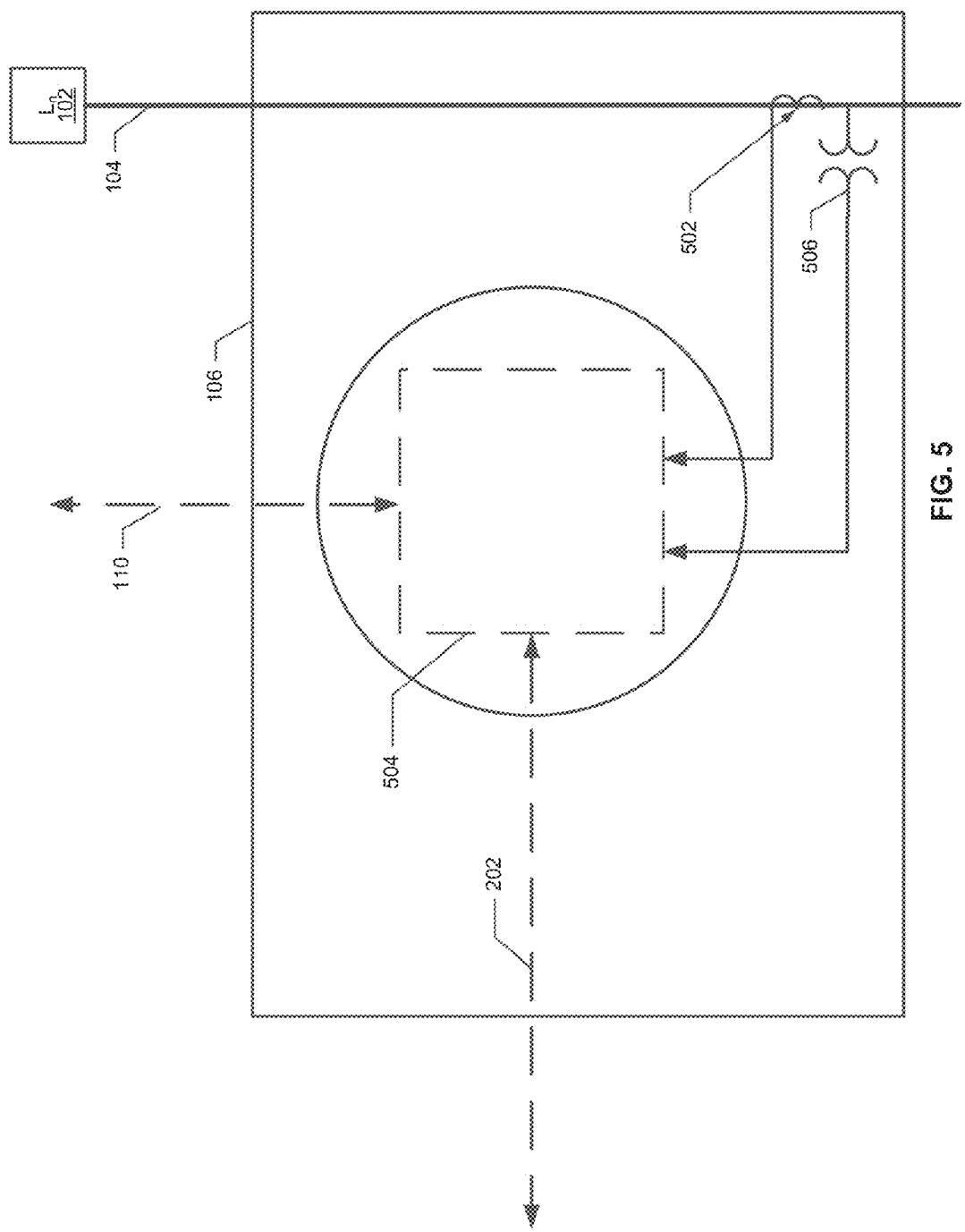
FIG. 5 illustrates an embodiment of a meter configured to communicate with appliances and devices over a second network and with a computing device over a first network.

FIG. 5 illustrates an embodiment of a meter 106 configured to communicate with smart appliances and devices 204 over a second network 202 and with a computing device 108 over a first network 110. Meter electronics 504 enable the meter 106 to communicate with the devices 204 and the computing device 108. In one aspect, the meter electronics 504 of the meter 106 receive over the first network 110, a single message, wherein the single message includes at least one device characteristic. The meter electronics 504 are used to determine one or more devices 204 associated with the at least one device characteristic, wherein each of the one or more devices 204 are connected to the second network 202. For example, in one aspect the single message comprises a device type for the devices 204 to be affected by the meter 106, and an address for a device 204 on the second network 202. For example, the single message can include an indicator, wherein the meter electronics 504 are configured to detect the indicator such that the single message is sent only to a single device 204 on the second network 202 or to a plurality of devices 204 on the second network 202. In one aspect, the indicator can be an address (e.g., HAN address) for a single device on the second network 202. In another aspect, the indicator can be a device type such that a plurality of devices 204 on the second network 202 that share the same type (e.g., HAN device type) all receive the message. The meter electronics 504 then transmit the single message over the second network 202 to each of the one or more devices 204 associated with the at least one device characteristic, wherein the single message is transmitted individually to each of the one or more devices 204 associated with the at least one device characteristic such that the single message is transmitted by the meter electronics 504 as many times as there are devices 204 associated with the at least one device characteristic. In one aspect, the meter electronics 504 can be used to receive a participation notice over the second network 202 from each of the one or more devices 204 associated with the at least one device characteristic that received the single message. The meter electronics 504 can be used to transmit a log of the participation notices as a singular instance over the first network 110, wherein the log includes an address for each of the one or more devices 204 associated with the at least one device characteristic that has sent the participation notice. As noted herein, in one aspect, the log can be compressed prior to transmitting the log of the participation notices as a singular instance over the first network 110. Further comprising the meter 106 are one or more current transformers (CTs) 502 or Rogowski coils and one or more potential transformers (PTs) 506 as may be required for metering, monitoring and power for the meter 106.

Figure 6:
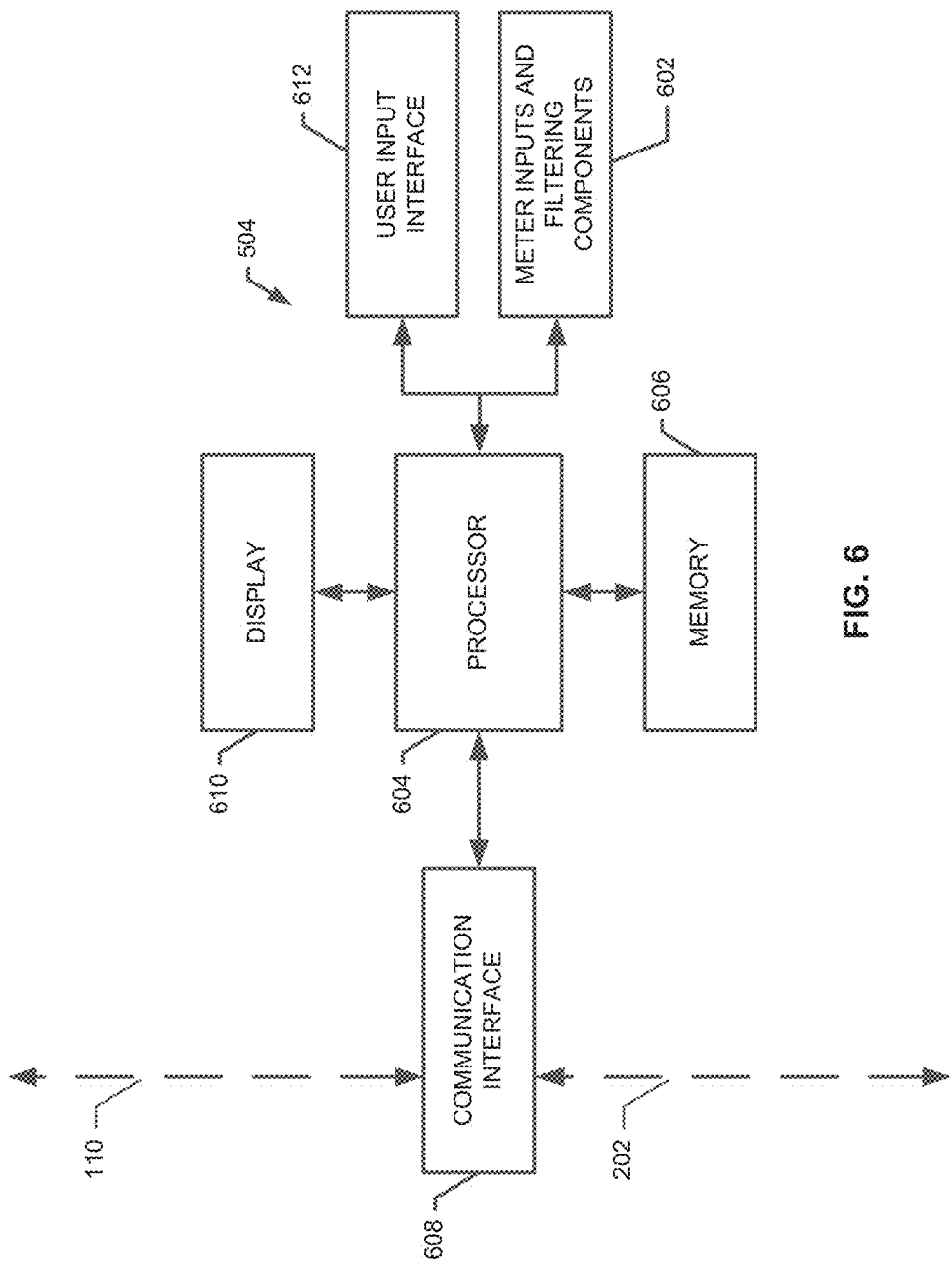
FIG. 6 illustrates a block diagram of an entity capable of operating as energy portal electronics in accordance with one embodiment of the present invention.

Referring now to FIG. 6, a block diagram of an entity capable of operating as meter electronics 504 is shown in accordance with one embodiment of the present invention. The entity capable of operating as meter electronics 504 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as meter electronics 504 can generally include means, such as one or more processors 604 for performing or controlling the various functions of the entity. As shown in FIG. 6, in one embodiment, meter electronics 504 can comprise meter inputs and filtering components 602. In one aspect, the meter inputs and filtering components 602 can comprise, for example, voltage and current inputs, one or more ADCs, and filtering components. Further comprising this embodiment of meter electronics 504 is a processor 604 and a memory 606. In one embodiment, the one or more processors 604 are in communication with or include memory 606, such as volatile and/or non-volatile memory that stores content, data or the like. For example, the memory 606 may store content transmitted from, and/or received by, the entity. For example, the memory 606 may store information shown and described in the database 300 of FIG. 3. Similarly, the memory 606 may store information as it is being transmitted to the devices 204 such as the message content. The memory 606 may also be used to store the log as described herein, which is transmitted to the computing device 108. Also, for example, the memory 606 may store software applications, instructions or the like for the processor 604 to perform steps associated with operation of the entity in accordance with embodiments of the present invention. In particular, the one or more processors 604 may be configured to perform the processes discussed in more detail herein for providing unicast functionality to one or more devices 204 connected to the second network 202. For example, according to one embodiment, the one or more processors 604 can be configured to receive using the network communication interface 608 and over the first network 110, a single message, wherein the single message includes at least one device characteristic; determine one or more of the devices 204 that are connected to the second network 202 that are associated with the at least one device characteristic; and transmit, using the network communication interface 608, the single message over the second network 202 to each of the one or more devices 204 associated with the at least one device characteristic, wherein the single message is transmitted individually to each of the one or more devices 204 associated with the at least one device characteristic such that the single message is transmitted as many times as there are devices 204 associated with the at least one device characteristic. For example, in one aspect the single message comprises a device type for the devices 204 to be affected by the meter 106, and an address for a device 204 on the second network 202. For example, the single message can include an indicator, wherein the one or more processors 604 are configured to detect the indicator such that the single message is sent only to a single device 204 on the second network 202 or to a plurality of devices 204 on the second network 202. In one aspect, the indicator can be an address (e.g., HAN address) for a single device on the second network 202. In another aspect, the indicator can be a device type such that a plurality of devices 204 on the second network 202 that share the same type (e.g., HAN device type) all receive the message.

In addition to the memory 606, the one or more processors 604 can also be connected to at least one interface or other means for displaying, transmitting and/or receiving data, content or the like. In this regard, the interface(s) can include at least one communication interface 608 or other means for transmitting and/or receiving data, content or the like, as well as at least one user interface that can include a display 610 and/or a user input interface 612. In one aspect, the communication interface 608 can be used to receive a single message from the computing device 108 via a first network 110, and to transmit the single message individually to each of the one or more devices 204 associated with the at least one device characteristic such that the single message is transmitted as many times as there are devices 204 associated with the at least one device characteristic. Furthermore, the communication interface 608 can be used to receive participation notices from each of the devices 204 that received the message via the second network 202, and to transfer the participation information to the computing device 108 via the first network 110. The user input interface 612, in turn, can comprise any of a number of devices allowing the entity to receive data from a user, such as a keypad, a touch display, a joystick or other input device.

Figure 7A:
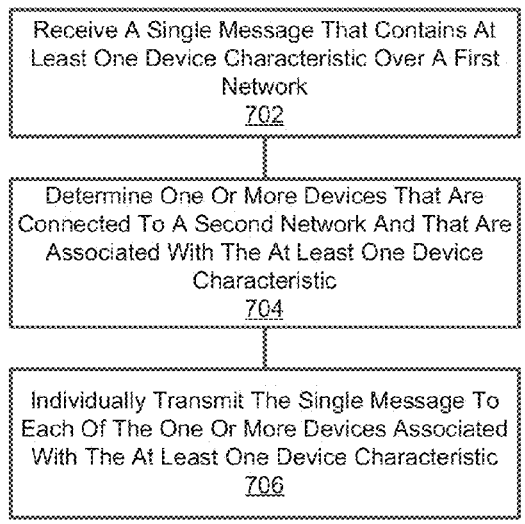
FIG. 7A is a flowchart illustrating the operations that may be taken for providing multicast functionality using an energy portal according to one embodiment of the present invention.

Referring now to FIG. 7A, the operations are illustrated that may be taken for providing multicast functionality using a meter. At step 702, a single message is received over a first network. The single message includes at least one device characteristic. For example, the device characteristics can be one or more of load control, pricing, messaging, and the like. In one aspect, the first network comprises an advanced metering infrastructure (AMI) network. In one aspect, the message is sent as part of a demand response management system (DRMS). At step 704, one or more devices associated with the at least one device characteristic are determined. Each of the one or more devices is connected to a second network. In one aspect, determining the one or more devices associated with the at least one device characteristic comprises comparing the at least one device characteristic contained in the single message with respective device characteristics of each of the one or more devices connected to the second network. In one aspect, the second network comprises a home area network (HAN). At step 706, the single message is transmitted over the second network to each of the one or more devices associated with the at least one device characteristic, wherein the single message is transmitted individually to each of the one or more devices associated with the at least one device characteristic such that the single message is transmitted as many times as there are devices associated with the at least one device characteristic.

Figure 7B:
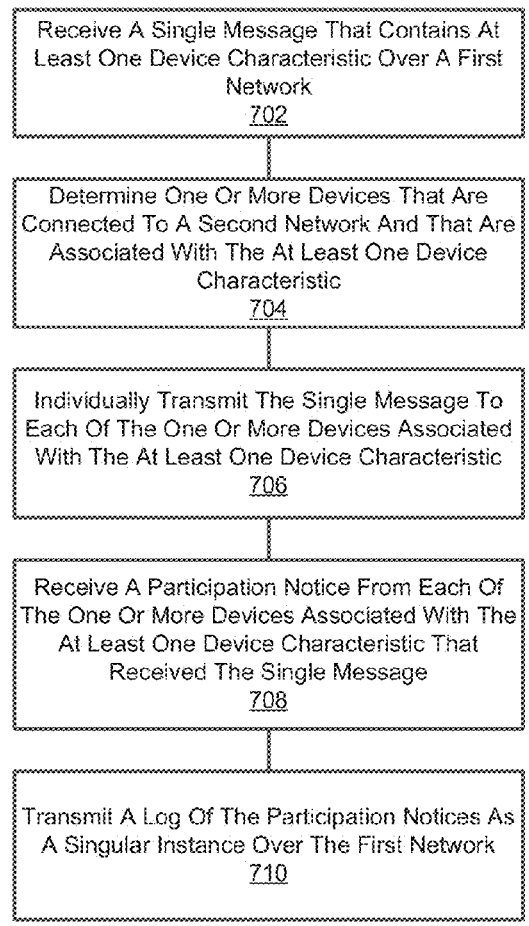
FIG. 7B is a flowchart illustrating steps that can be taken for providing multicast functionality using an energy portal according to another embodiment of the present invention.

FIG. 7B is a flowchart illustrating an alternate embodiment of the process described in relation to FIG. 7A. In FIG. 7B, the process further includes steps 708, and 710. At step 708, a participation notice is received over the second network from each of the one or more devices associated with the at least one device characteristic that received the single message. At step 710, a log of the participation notices is transmitted as a singular instance over the first network, wherein the log includes an address for each of the one or more devices associated with the at least one device characteristic that has sent the participation notice. In one aspect, the log can be compressed prior to transmitting the log of the participation notices as a singular instance over the first network.

Figure 8:
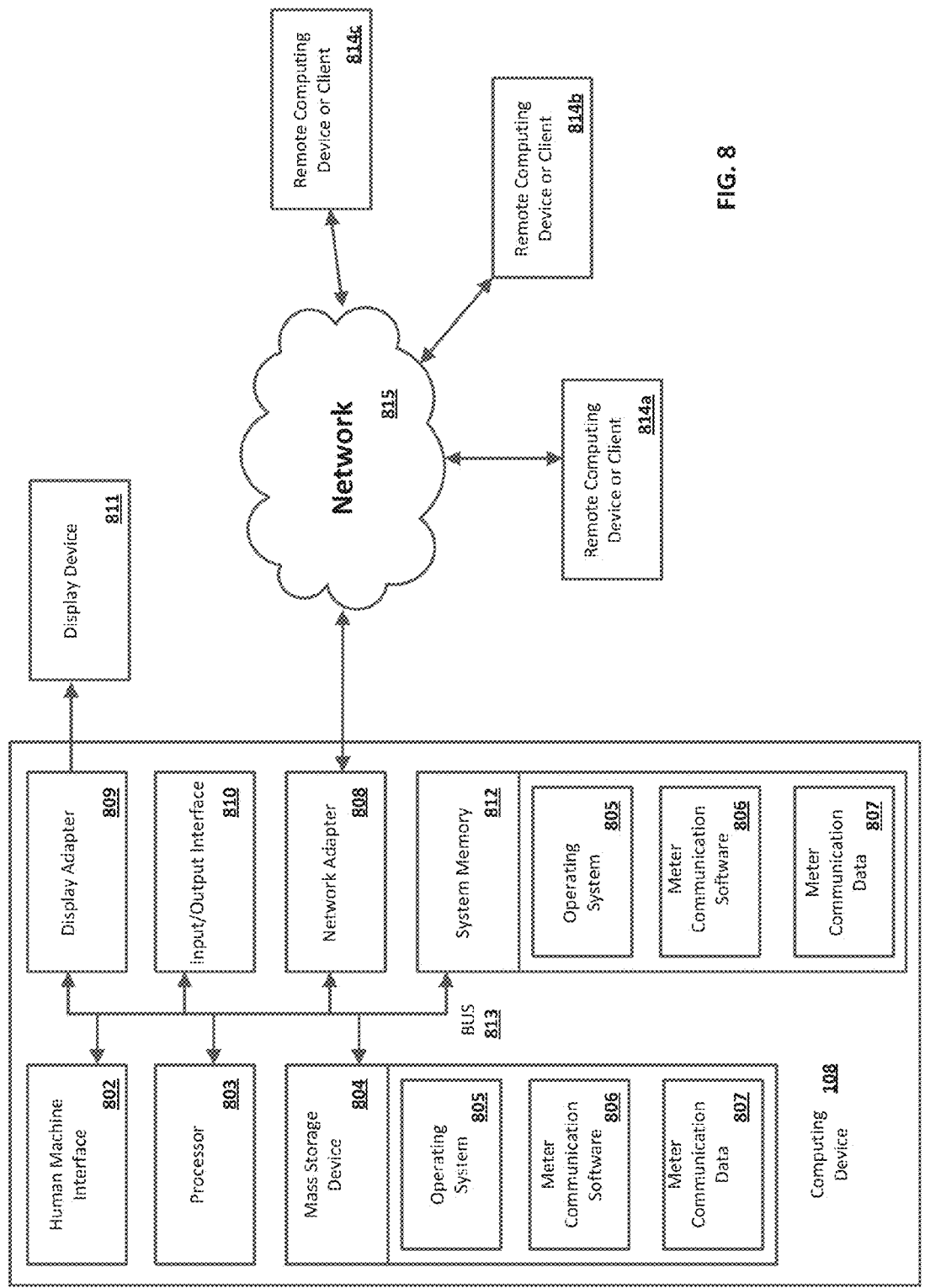
FIG. 8 is a block diagram illustrating an exemplary operating environment for performing aspects of the disclosed methods.

The above system has been described above as comprised of units. One skilled in the art will appreciate that this is a functional description and that software, hardware, or a combination of software and hardware can perform the respective functions. A unit, such as a smart appliance or device, a smart meter, a smart grid, a utility computing device, a vendor or manufacturer's computing device, etc., can be software, hardware, or a combination of software and hardware. The units can comprise, meter communication software 806 such as, for example, DRMS software as illustrated in FIG. 8 and described below. In one exemplary aspect, the units can comprise a computing device 108 as illustrated in FIG. 8 and described below.

FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 108. The components of the computing device 108 can comprise, but are not limited to, one or more processors or processing units 803, a system memory 812, and a system bus 813 that couples various system components including the processor 803 to the system memory 812. In the case of processors 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnect (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, meter communication software 806, meter communication data 807 such as, for example, the table 400 shown and described in relation to FIG. 4, a network adapter 808, a system memory 812, an Input/Output Interface 810, a display adapter 809, a display device 811, and a human machine interface 802, can be contained within one or more remote computing devices or clients 814*a, b, c* at physically separate locations, connected through buses of this form, in effect implementing a fully distributed system or distributed architecture.

The computing device 108 typically comprises a variety of computer readable media. Exemplary readable media can be any available media that is non-transitory and accessible by the computing device 108 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as meter communication data 807 and/or program modules such as operating system 805 and meter communication software 806 that are immediately accessible to and/or are presently operated on by the processor 803.

In another aspect, the computer 108 can also comprise other non-transitory, removable/non-removable, volatile/non-volatile computer storage media. By way of example, FIG. 8 illustrates a mass storage device 804 that can provide non-volatile storage of computer code, computer readable instructions, data structures, program modules, and other data for the computing device 108. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memory (RAM), read only memory (ROM), electrically erasable programmable read-only memory (EEPROM), and the like.

Optionally, any number of program modules can be stored on the mass storage device 804, including by way of example, an operating system 805 and meter communication software 806. Each of the operating system 805 and meter communication software 806 (or some combination thereof) can comprise elements of the programming and the meter communication software 806. Meter communication data 807 can also be stored on the mass storage device 804. Meter communication data 807 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 108 via an input device (not shown). Examples of such input devices comprise, but are not limited to, a keyboard, pointing device (e.g., a "mouse"), a microphone, a joystick, a scanner, tactile input devices such as gloves, and other body coverings, and the like These other input devices can be connected to the processor 803 via a human machine interface 802 that is coupled to the system bus 813, but can be connected by other interface and bus structures, such as a parallel port, a game port, an IEEE 1394 (also known as a Firewire port), a serial port, or a universal serial bus (USB).

In yet another aspect, a display device 811 can also be connected to the system bus 813 via an interface, such as a display adapter 809. It is contemplated that the computing device 108 can have more than one display adapter 809 and the computing device 108 can have more than one display device 811. For example, a display device can be a monitor, an LCD (Liquid Crystal Display), or a projector. In addition to the display device 811, other output peripheral devices can comprise components such as speakers (not shown) and a printer (not shown), which can be connected to the computing device 108 via input/output interface 810. Any step and/or result of the methods can be output in any form to an output device. Such output can be any form of visual representation, including, but not limited to, textual, graphical, animation, audio, tactile, and the like.

The computing device 108 can operate in a networked environment using logical connections to one or more remote computing devices or clients 814*a, b, c*. By way of example, a remote computing device 814 can be a personal computer, a portable computer, a server, a router, a network computer, a smart meter, a vendor or manufacturer's computing device, smart grid components, a peer device or other common network node, and so on. Logical connections between the computing device 108 and a remote computing device or client 814*a, b, c* can be made via a local area network (LAN) and a general wide area network (WAN). Such network connections can be through a network adapter 808. A network adapter 808 can be implemented in both wired and wireless environments. Such networking environments are conventional and commonplace in offices, enterprise-wide computer networks, intranets, and other networks 815 such as the Internet.

For purposes of illustration, application programs and other executable program components such as the operating system 805 are illustrated herein as discrete blocks, although it is recognized that such programs and components reside at various times in different storage components of the computing device 108, and are executed by the data processor(s) of the computer. An implementation of meter communication software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 604 discussed above with reference to FIG. 6, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 604 of FIG. 6) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; or the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:
receiving, at a meter and over a first network, a single message, wherein the single message includes a unique meter identifier associated with the meter, an indicator of a device type, and at least one device characteristic;
detecting, using a processor, the indicator;
identifying, using the processor, the device type using the indicator;
determining, using a processor, one or more devices of the device type, wherein each of the one or more devices of the device type is connected to a second network, wherein the one or more devices of the device type are a subset of all devices connected to the second network, and wherein the determining comprises associating, in a database, the at least one device characteristic and the unique meter identifier with one or more unique device identifiers associated with each of the one or more devices of the device type; and
transmitting the single message over the second network to each of the one or more devices of the device type to control the at least one device characteristic of each of the one or more devices of the device type, wherein the single message is transmitted individually to each of the one or more devices of the device type such that the single message is transmitted as many times as there are devices of the device type, and wherein each of the one or more devices of the device type is configured to detect the indicator.

2. The method of claim 1, further comprising receiving a participation notice over the HAN from each of the one or more devices of the load type that received the single message.

3. The method of claim 2, further comprising transmitting a log of the participation notices as a singular instance over the first network, wherein the log includes an address for each of the one or more devices of the device type that has sent the participation notice.

4. The method of claim 3, further comprising compressing the log prior to transmitting the log of the participation notices as a singular instance over the first network.

5. The method of claim 1, wherein receiving over the first network, the single message comprises receiving the single message including one or more device characteristics of load control, pricing and messaging.

6. The method of claim 1, wherein receiving, over the first network, the single message comprises receiving the single message over an advanced metering infrastructure (AMI) network.

7. The method of claim 1, wherein determining, using the processor, one or more devices of the load type associated with the at least one device characteristic comprises comparing, using the processor, the at least one device characteristic contained in the single message with respective device characteristics of each of the one or more devices connected to the second network.

8. The method of claim 1, wherein the one or more devices of the device type comprise one or more of an in-home energy display, a programmable thermostat, a demand response load controller, or a prepayment terminal.

9. A system comprised of:
a first network;
a computing device connected to the first network;
a second network;
one or more devices connected to the second network;
an energy portal, wherein the energy portal comprises a network interface, a memory, and a processor, wherein the network interface connects the energy portal with the first network and the second network, and wherein the processor is configured to:
receive, using the network interface and over the first network, a single message,
wherein the single message includes a unique meter identifier associated with the meter,
an indicator of a device type, and at least one device characteristic;
detect the indicator;
identify the device type based on the indicator included in the single message;
determine one or more devices that are connected to the second network that are of the device type, wherein the one or more devices of the device type are a subset of all devices connected to the second network, and wherein the determining comprises associating, in a database, the at least one device characteristic and the unique meter identifier with one or more unique device identifiers associated with each of the one or more devices of the device type; and
transmit, using the network interface, the single message over the second network to each of the one or more devices of the device type to control the at least one device characteristic of each of the one or more devices of the device type, wherein the single message is transmitted individually to each of the one or more devices of the device type such that the single message is transmitted as many times as there are devices of the device type, and wherein each of the one or more devices of the device type is configured to detect the indicator.

10. The system of claim 9, wherein the processor is further configured to receive, using the network interface, a participation notice over the second network from each of the one or more devices of the device type that has sent the participation notice.

11. The system of claim 10, further comprising storing on the memory a log of the received participation notices and transmitting the log of the participation notices as a singular instance over the first network, wherein the log includes an address for each of the one or more devices of the device type that has sent the participation notice.

12. The system of claim 11, wherein the log is compressed prior to transmitting the log of participation notices as a singular instance over the first network.

13. The system of claim 9, wherein the device characteristics comprise one or more of load control, pricing, and messaging.

14. The system of claim 9, wherein the first network comprises an advanced metering infrastructure (AMI) network.

15. The system of claim 9, wherein the processor is configured to determine one or more devices of the load type associated with the at least one device characteristic by comparing the at least one device characteristic contained in the single message with respective device characterictics of each of the one or more devices connected to the second network stored in the memory.

16. The system of claim 9, wherein the one or more devices of the device type comprise one or more of an in-home energy display, a programmable thermostat, a demand response load controller, or a prepayment terminal.

17. The system of claim 9, wherein the energy portal comprises a utility meter.

18. An energy portal comprised of:
a network interface;
a memory; and
a processor, wherein the network interface connects the energy portal with a first network and a second network, and wherein the processor is configured to:
receive, using the network interface and over the first network, a single message,
wherein the single message includes a unique meter identifier associated with the meter,
an indicator of a device type, and at least one device characteristic;
detect the indicator;
identify the device type using the indicator;
determine one or more of the devices that are connected to the second network that are of the device type wherein the one or more devices of the device type are a subset of all devices connected to the second network, and wherein the processor is further configured to associate, in a database, the at least one device characteristic and the unique meter identifier with one or more unique device identifiers associated with each of the one or more devices of the device type; and
transmit, using the network interface, the single message over the second network to each of the one or more devices of the devices type to control the at least one device characteristic of each of the one or more devices of the device type, wherein the single message is transmitted individually to each of the one or more devices of the device type such that the single message is transmitted as many times as there are devices of the devices type, and wherein each of the one or more devices of the device type is configured to detect the indicator.

19. The energy portal of claim 18, wherein the processor is further configured to receive, using the network interface, a participation notice over the second network from each of the one or more devices of the device type that received the single message.

20. The energy portal of claim 19, further comprising storing on the memory a log of the received participation notices and transmitting the log of the participation notices as a singular instance over the first network, wherein the log includes an address for each of the one or more devices of the device type that has sent the participation notice.

21. The energy portal of claim 20, wherein the log is compressed prior to transmitting the log of the participation notices as a singular instance over the first network.

22. The energy portal of claim 18, wherein the device characteristics comprise one or more of load control, pricing, and messaging.

23. The energy portal of claim 18, wherein the first network comprises an advanced metering infrastructure (AMI) network.

24. The energy portal of claim 18, wherein the processor is configured to determine one or more devices of the device type associated with the at least one device characteristic by comparing the at least one device characteristic contained in the single message with respective device characteristics of each of the one or more devices connected to the second network stored in memory.

25. The energy portal of claim 18, wherein the one or more devices of the device type comprise one or more of an in-home energy display, a programmable thermostat, a demand response load controller, or a prepayment terminal.

26. The energy portal of claim 18, wherein the energy portal comprises a meter.

* * * * *